(12) United States Patent
Mass et al.

(10) Patent No.: US 9,105,036 B2
(45) Date of Patent: Aug. 11, 2015

(54) VISUALIZATION OF USER SENTIMENT FOR PRODUCT FEATURES

(75) Inventors: Yosi Mass, Ramat Gan (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/609,302

(22) Filed: Sep. 11, 2012

(65) Prior Publication Data

US 2014/0071134 A1 Mar. 13, 2014

(51) Int. Cl.
*G06T 11/20* (2006.01)
*G06Q 30/00* (2012.01)
*G06Q 30/02* (2012.01)

(52) U.S. Cl.
CPC ...................... *G06Q 30/02* (2013.01)

(58) Field of Classification Search
CPC .............. G06T 11/20; G06Q 30/0281; G06Q 30/0282; G06Q 30/02; G06Q 30/0201
USPC .......................... 345/440; 705/347, 26.1–27.2
See application file for complete search history.

(56) References Cited

U.S. PATENT DOCUMENTS

| | | | |
|---|---|---|---|
| 6,490,567 B1* | 12/2002 | Gregory ........................... | 705/39 |
| 7,886,000 B1* | 2/2011 | Polis et al. ..................... | 709/203 |
| 8,108,535 B1* | 1/2012 | Roberts et al. ................. | 709/231 |
| 2007/0079236 A1* | 4/2007 | Schrier et al. .................. | 715/517 |
| 2008/0012863 A1* | 1/2008 | Finn et al. ...................... | 345/473 |
| 2008/0215543 A1* | 9/2008 | Huang et al. ....................... | 707/3 |
| 2009/0112686 A1* | 4/2009 | Sheehan et al. ................. | 705/10 |
| 2009/0282019 A1* | 11/2009 | Galitsky et al. .................... | 707/5 |
| 2010/0036753 A1* | 2/2010 | Harvill et al. ..................... | 705/27 |
| 2010/0114954 A1* | 5/2010 | Sareen et al. ................. | 707/776 |
| 2011/0004652 A1* | 1/2011 | Long ............................ | 709/203 |
| 2011/0251973 A1 | 10/2011 | Chen et al. | |
| 2012/0016518 A1* | 1/2012 | Saario et al. ................... | 700/232 |
| 2012/0209751 A1* | 8/2012 | Chen et al. ................... | 705/27.2 |
| 2012/0254060 A1* | 10/2012 | Choudhary et al. .......... | 705/347 |
| 2013/0047094 A1* | 2/2013 | Kotorov et al. ............... | 715/753 |
| 2014/0033069 A1* | 1/2014 | Chegini et al. ................ | 715/751 |

OTHER PUBLICATIONS

SeatGuru, How to find the best seats in the plane, Oct. 19, 2011, seatguru.com, pp. 1-1.*

(Continued)

*Primary Examiner* — David Zarka
*Assistant Examiner* — Brian Kravitz
(74) *Attorney, Agent, or Firm* — Ziu Glazberg (57) ABSTRACT

Method, system, and computer program product are provided for visualization of user sentiment for one or more product features. The method may include: providing one or more product image templates, a product image template having a location representing a product feature; obtaining an aggregated sentiment score for a product feature from user generated content; mapping the aggregated sentiment score to a score visualization on a visualization scale; and representing the location in the product image template relating to the product feature with the score visualization for the aggregated sentiment score to provide a visualization of the product. The method may also include: collecting one or more text expressions from user generated content relating to a product feature; representing one or more text expressions in relation to the product feature in the product image template.

21 Claims, 8 Drawing Sheets

(56) References Cited

OTHER PUBLICATIONS

Amazon, Citizen Men's AT0200-05E Eco-Drive Chronograph Canvas Watch, May 4, 2012, http://www.amazon.com/Citizen-AT0200-05E-Eco-Drive-Chronograph-Canvas/dp/B000EQR6H0, pp. 1-1.*
Zhang et al, Feature-level Sentiment Analysis for Chinese Product Reviews, 2011, IEEE, pp. 135-140.*
Miao et al, AMAZING: A sentiment mining and retrieval system, 2008, Expert Systems with Applications, pp. 7192-7198.*
Barnes, Features touch consumers. Strategies do not., Jun. 19, 2012, Sneakerhead VC, pp. 1-4.*
Cheff, Create Product Documentation with Inventor Publisher 2012, Aug. 25, 2011, http://www.cadalyst.com/cad/inventor/create-product-documentation-with-inventor-publisher-2012-14034, pp. 1-5.*
Popescu et al, Extracting Product Features and Opinions from Reviews, Oct. 2005, Association for Computational Linguistics, pp. 339-346.*
Evans, GMail's Rep Takes a Huge Hit, Sep. 2, 2009, http://blog.sysomos.com/tag/sentiment/, pp. 1-3.*
AlaTest, Samsung GALAXY SIII (S3), https://web.archive.org/web/20120823090726/http://alatest.com/reviews/cell-phone-reviews/samsung-galaxy-s-iii-s3/po3-134876408,8/, pp. 1.*
Bo Pang and Lillian Lee, "Opinion Mining and Sentiment Analysis", Foundations and Trends in Information Retrieval, vol. 2, No. 1-2, pp. 1-135, 2008.
IPCOM000196562D, "A method of Visually Analyzing and Comparing Complex Opinions", Prior art Database, IP.com, Jun. 7, 2010. URL: http://ip.com/IPCOM/000196562.

* cited by examiner

VISUALIZATION OF USER SENTIMENT FOR PRODUCT FEATURES

BACKGROUND

This invention relates to the field of user feedback for products. In particular, the invention relates to visualization of user sentiment for product features.

Opinion mining and sentiment analysis have become important tools for extracting insights about users' opinions and sentiments towards topics of interests, products, and services.

Traditionally, sentiment analysis tools consume large amounts of user generated content and extract sentiment polarities and opinions from such content on different topics or aspects of products. An aggregated score may be calculated for each sentiment polarity or opinion and this may be summarized.

Sentiment and opinion summarization is an important aspect, and several methods for summarization are known based on visualization. However, many sentiment visualization techniques are not intuitive enough for ordinary users who are neither visualization nor analytics experts.

BRIEF SUMMARY

According to a first aspect of the present invention there is provided a computer-implemented method for visualization of user sentiment for one or more product features, comprising: providing one or more product image templates, a product image template having a location representing a product feature; obtaining an aggregated sentiment score for a product feature from user generated content; mapping the aggregated sentiment score to a score visualization on a visualization scale; and representing the location in the product image template relating to the product feature with the mapped score visualization for the aggregated sentiment score to provide a visualization of the product.

According to a second aspect of the present invention there is provided a computer program product for visualization of user sentiment for one or more product features, the computer program product comprising: a computer readable non-transitory storage medium having computer readable program code embodied therewith, the computer readable program code comprising: computer readable program code configured to: provide one or more product image templates, a product image template having a location representing a product feature; obtain an aggregated sentiment score for a product feature from user generated content; map the aggregated sentiment score to a score visualization on a visualization scale; and represent the location in the product image template relating to the product feature with the mapped score visualization for the aggregated sentiment score to provide a visualization of the product.

According to a third aspect of the present invention there is provided a system for visualization of user sentiment for one or more product features, comprising: a processor; a template retrieving component for providing one or more product image templates, a product image template having a location representing a product feature; an aggregating component for obtaining an aggregated sentiment score for a product feature from user generated content; a visualization mapping component for mapping the aggregated sentiment score to a score visualization on a visualization scale; and a template visualizing component for representing the location in the product image template relating to the product feature with the score visualization for the aggregated sentiment score to provide a visualization of the product.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described in which user sentiments relating to product features are visualized on a product image template to provide an intuitive, aggregated and integrative view of the product sentiments. User sentiments may include opinions, likes/dislikes, views, etc.

The described concept focuses on the visualization of sentiments relating to a given product based on user generated content (UGC) input about the product and its various features. For a given product (for example, a mobile phone, laptop, shaving machine, etc.), a product template with the main product features are represented using a visualization scale (for example, a color scale or bar scale) that reflects the various sentiments of each product feature based on UGC analysis.

The visualization may further provide the user with a 3D navigation scheme (for example, rotation, up, down, zoom in/out), which enables the user to explore the various sentiments of the product features. The visualization provides an aggregated and integrative view of the product sentiments, and therefore, provides an intuitive sentiment summarization to end consumers.

The proposed visualization may be integrated within an ecommerce website, providing sentiment visualization for products being sold to end users.

Figure 1:
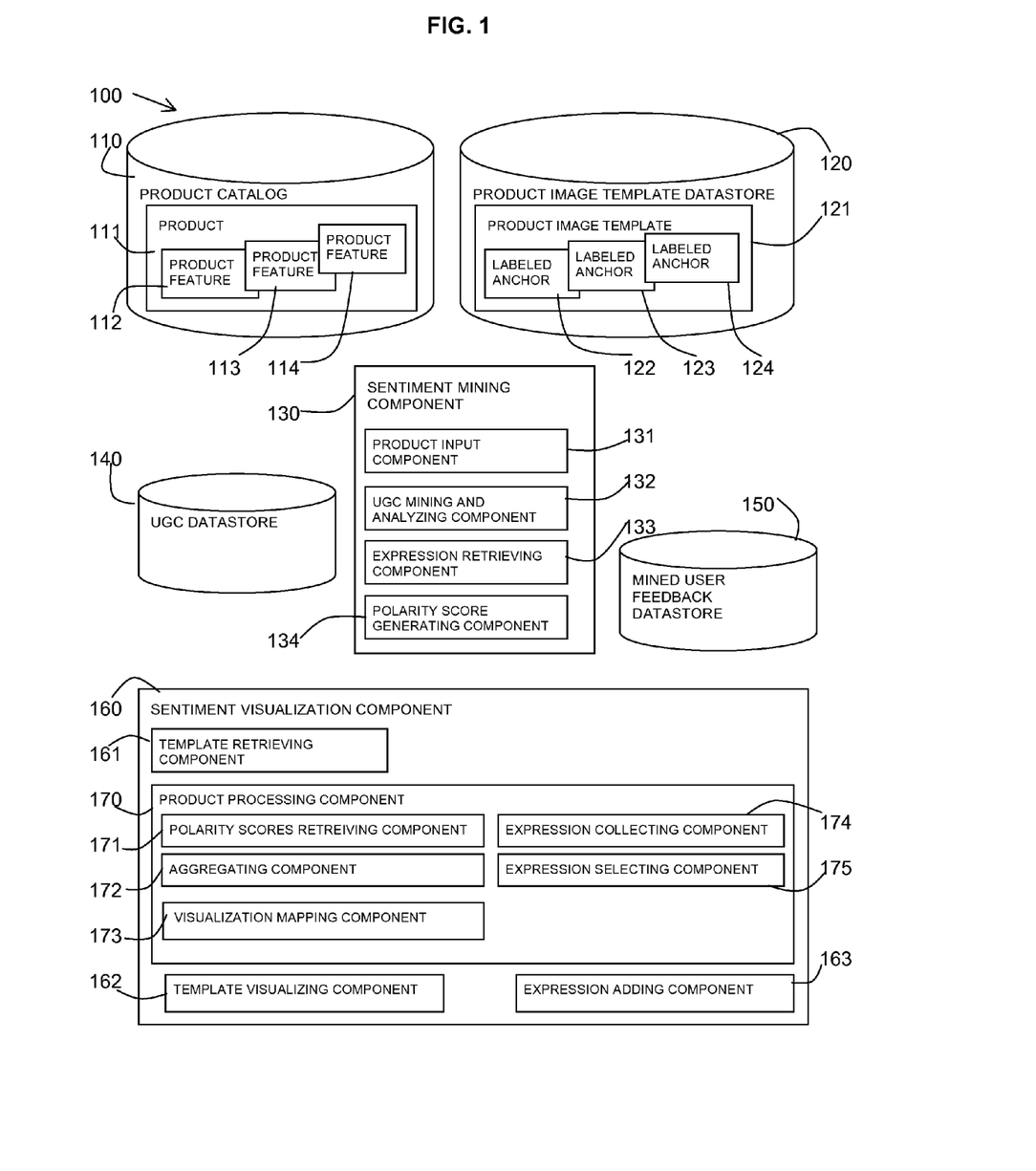
FIG. 1 is a block diagram of an aspect of a system in accordance with the present invention.

Referring to FIG. 1, a block diagram of an example embodiment of the described system 100 is shown.

A product catalog 110 may be provided including, for each product p 111, a list of product features f 112-114. A product image template datastore 120 may be provided with one or more product image templates 121 for a product 111. Multiple product image templates 121 may be provided, for example, showing different views of the product 111, which may be used for visualizing a 3D image of the product 111.

A product image template 121 may include multiple labeled anchors 122-124 relating to the product features 112-114 and, optionally, to the product itself. The labeled anchors 122-124 may be located at the product features 112-114 or with a pointer to the product features 112-114 and may enable visualization of user sentiment of these features 112-114. The labeled anchors represent the location of the features in the image template 121. The location may be an area or a point in the image template 121. When a sentiment is extracted for a product feature it is shown on the image template 121 at the location of the labeled anchors.

A UGC datastore 140 may be provided which may be a remote datastore or local to the system 100. The user generated content may be collected from open sources such as social media or public product feedback sources. The user generated content may also be collected from private sources, for example, the product manufacture's own feedback sources.

A sentiment mining component 130 may be provided for mining and analyzing UGC data relating to a product 111 and its associated product features 112-114. The sentiment mining component 130 may include a product input component 131 providing indication of the product 111 to be analyzed and its associated product features 112-114. A UGC mining and analyzing component 132 may be provided for mining and analyzing the UGC datastore 140 for the input product 111. A polarity score generating component 134 may be provided for generating sentiment polarity scores which may be stored in a datastore of mined user feedback 150. Sentiment polarity scores may be obtained using existing analytic tools (for example, IBM's Cognos Consumer Insight (IBM and Cognos Consumer Insight are trade marks of International Business Machines Corporation)). The sentiment polarity scores may provide an indication on a scale of the positive to negative sentiment relating to a product and to the product's features.

The sentiment mining component 130 may also include an expression retrieving component 133 for retrieving expressions or list mentions within UGCs (i.e., user messages that express sentiments toward the product) which users may have input relating to a product and a product's features. These expressions may also be stored in the datastore of mined user feedback 150.

A sentiment visualization component 160 may be provided. This is shown separately from the sentiment mining component 130; however, these may be integrated or provided as separate components.

The sentiment visualization component 160 may include a template retrieving component 161 for retrieving one or more product image templates 121 relating to a product 111.

The sentiment visualization component 160 may include a product processing component 170 for analyzing the sentiment for each product features 112-114 of a product 111 to be visualized on the product image templates 121 using the labeled anchors 122-124 for each product features 112-114. The product feature processing component 170 may also analyze the sentiment for the product 111 itself for visualization on the product image templates 121.

The product processing component 170 may include a polarity scores retrieving component 171 for retrieving polarity scores for product features 112-114 from a mined user feedback datastore 150. An aggregating component 172 may aggregate multiple polarity scores for a product features 112-114 resulting in overall aggregated polarity scores.

A visualization mapping component 173 may map an aggregated polarity score to a visualization scale to provide a score visualization to visually represent the aggregated polarity score for the product features 112-114. For example, the score visualization may be a color scale, a bar representation showing different heights from low to high, a number represented showing the score. In the case of a color scale, the color may go from green (positive) to red (negative) through an intermediate range of colors. Alternatively, a color range may be from pale to strong in a single color, including greyscale. Another color may be provided for neutral sentiment.

The product processing component 170 may also include an expression collecting component 174 for collecting text expressions relating to the product features 112-114 from a mined user feedback datastore 150. An expression selecting component 175 may select one or several of the average or most informative expressions. The selection of sample expressions may be such that uniformly selects messages based on the distribution induced by the polarities for that feature.

The product processing component 170 may, optionally, apply the described components to the product 111 as a whole as well as to the product features 112-114.

The sentiment visualization component 160 may also include a template visualizing component 162 for applying the score visualization mapped by the visualization mapping component 173 to the labeled anchor 122-124 of the product image templates 121 for the product features 112-114. A representation for a score visualization mapping for the entire product 111 may also be provided, for example, in the form of an outline color or an icon representation of the product 111.

The sentiment visualization component 160 may also include an expression adding component 163 for adding one or more selected expressions to the to the labeled anchor 122-124 of the product image templates 121 for the product features 112-114.

Figure 2:
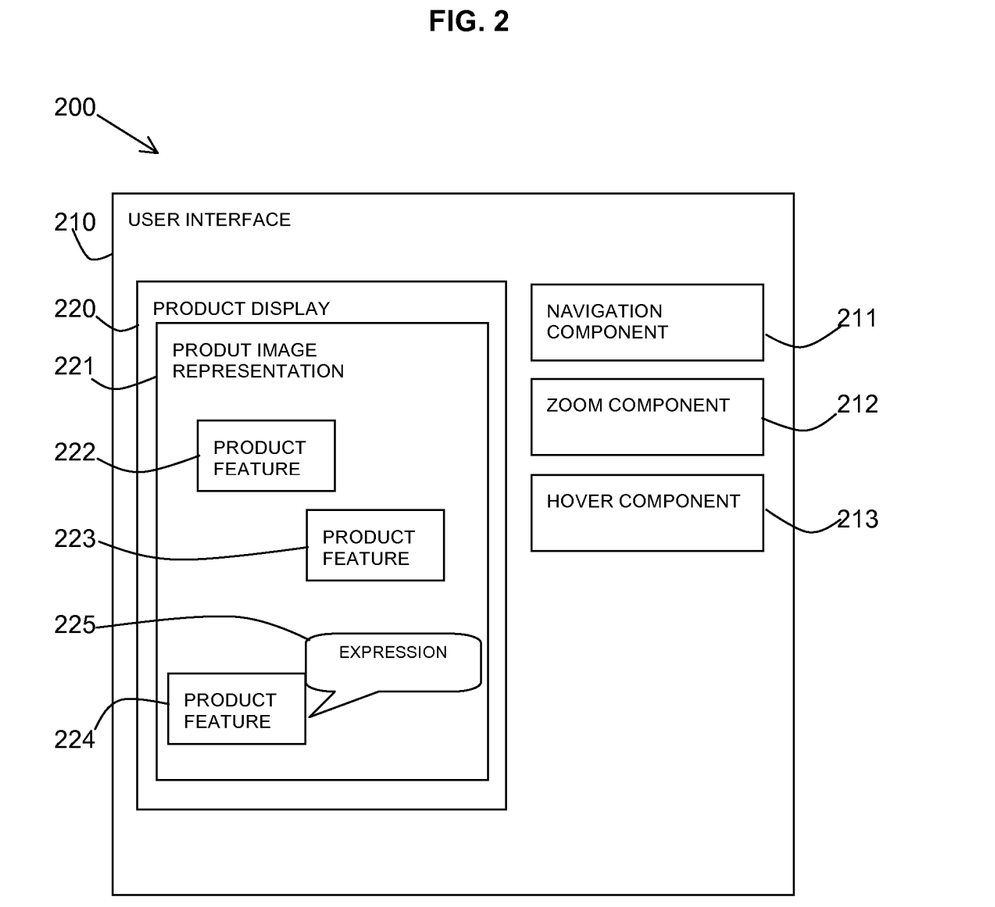
FIG. 2 is a block diagram of an aspect of a system in accordance with the present invention.

Referring to FIG. 2, a block diagram shows an example embodiment of an aspect of the described system 200. The system 200 includes a user interface 210 for displaying a product display 220 including visualization of user sentiment and feedback.

The product display 220 may include a product representation 221 which is formed of one or more product image templates. The product representation 221 may provide a 2D or 3D representation of the product. Product features 222-224 may be represented with a score visualization of the aggregated consumer sentiment towards the product feature 222-224 (for example, by color, bars, etc.). In addition, text expressions 225 may be provided associated with a product feature 222-224 or the product itself indicating text expressions 225 that are representative of user feedback. For example, text expressions 225 may be provided as call outs or pop ups when a user hovers over a features.

The user interface 210 may include a navigation component 211 for a user to navigate around the product representation (for example, including up, down, rotation, etc.). In the case of a 3D representation of the product, a user may rotate the product image, turn it up/down in a 3D space.

In addition, a zoom component 212 may allow a user to zoom in or out of the product representation 221 in order to gain more detail or to gain an overall picture. Using this feature it is possible to visualize a finer granular feature scale on the product image templates.

A hover component 213 may be provided for enabling additional information and exploration. For example, text expressions 252 may be accessed whilst the user hovers with a pointer device over a product feature 222-224. The text expression may be user sample representative UGC messages that were used to calculate the sentiment polarities for that feature.

Figure 3:
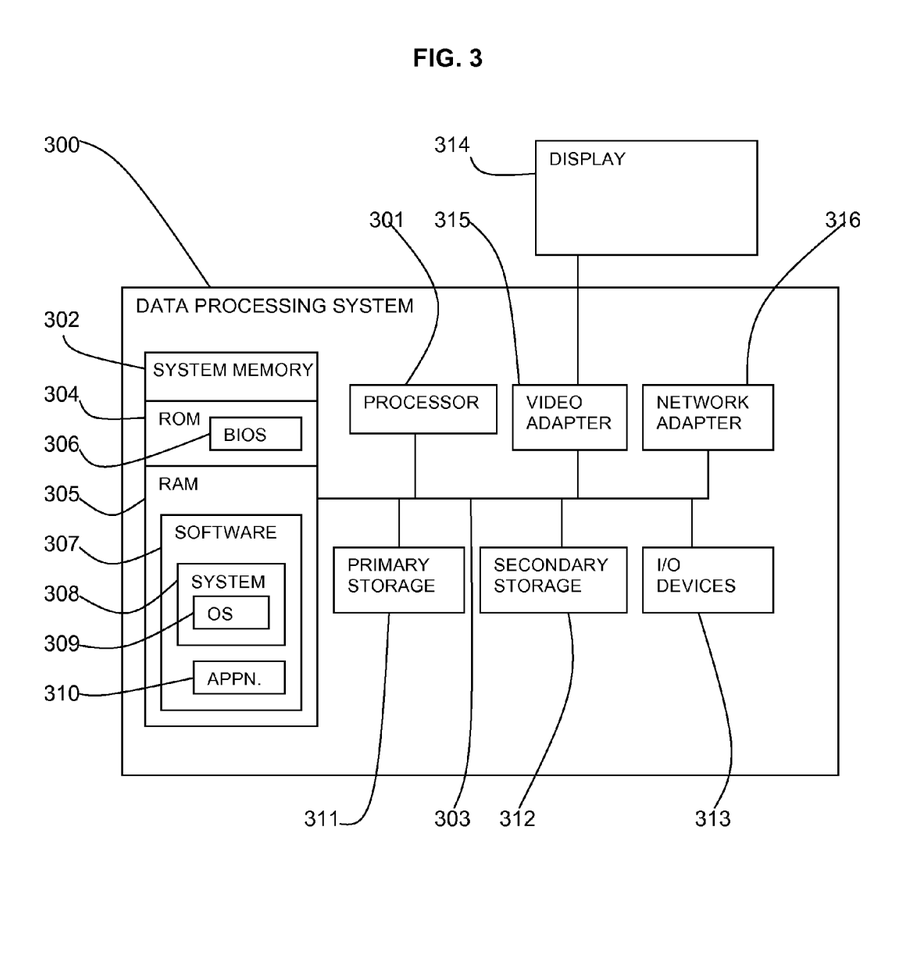
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. Software 307 may be stored in RAM 305 including system 308, which may include Operating System (OS) 309. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
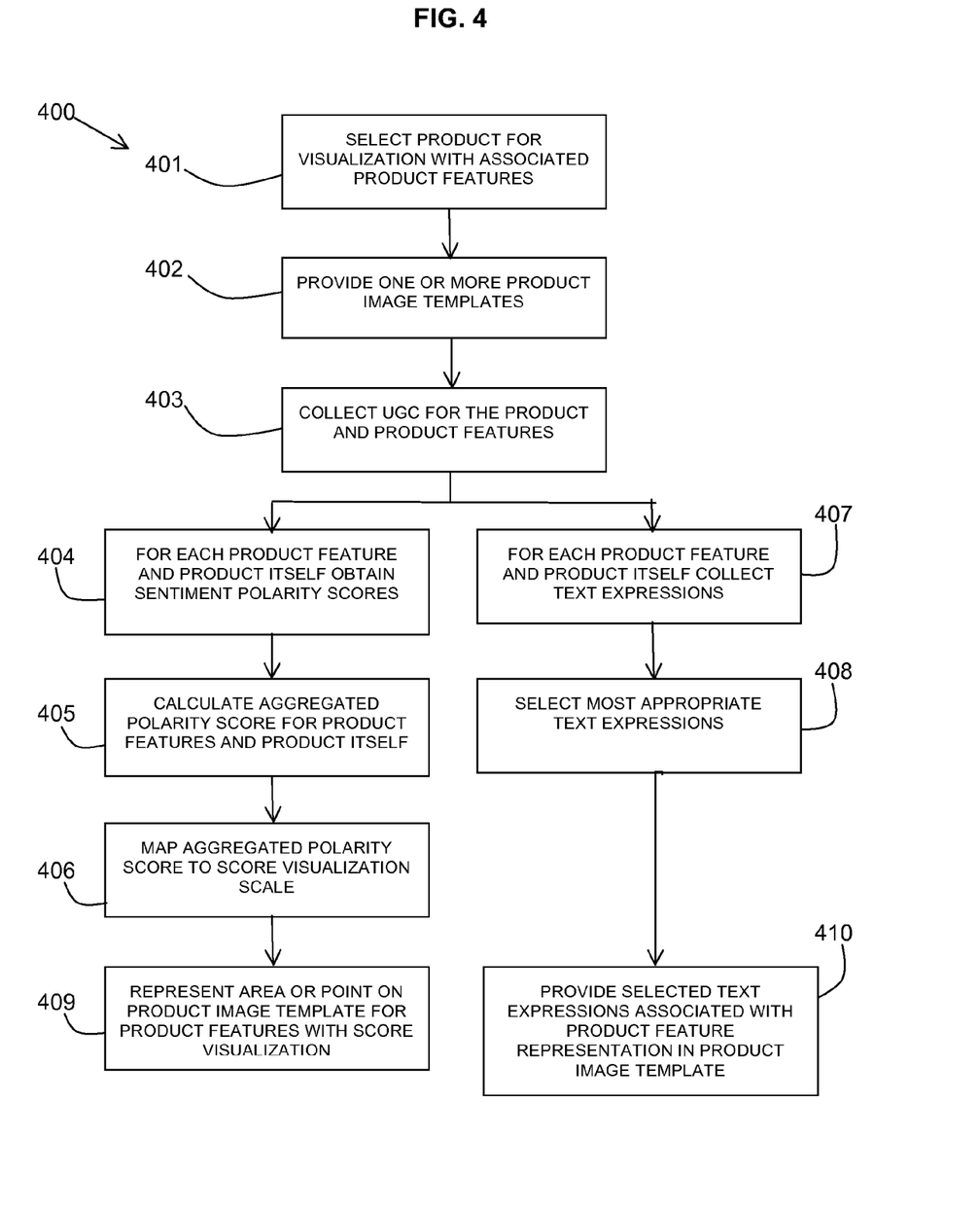
FIG. 4 is a flow diagram of an aspect of a method in accordance with the present invention.

Referring to FIG. 4, a flow diagram 400 shows an example embodiment of an aspect of the described method.

A product for visualization may be selected 401 with associated product features. One or more product image templates may be provided 402. These may be generated or retrieved from a database. The product image templates may have labeled anchors for the product features in the templates.

User generated content relating to the product and the product features may be collected 403. This may be collected from open sources or from private sources.

For each of the product features f and, optionally, the product p itself, sentiment polarity scores may be obtained 404, these may be calculated or, if already available, retrieved from a database. Based on the relative polarity scores, an aggregated score may be calculated 405. The aggregated score for each feature may be the average over all polarities of messages that are related to the feature. The aggregated score may be mapped or translated 406 into a visualization scale to provide a score visualization denoting the overall sentiment score of the product or feature.

In addition, a text expressions may be collected 407 for the product and product features from the UGC. Most appropriate expressions may be selected 408 for the product and product features based on their appropriateness to the sentiment polarity score, their frequency of occurrence, etc.

An area or point on a product image template that represents each product feature or the product itself may be represented 409 by the score visualization, for example, a color shade based on the color scale and color value calculated for that feature.

In addition, one or more selected text expressions for the product and product features may be provided 410 in relation to the visualization of the product and product features. For example, this may be as a call-out graphic, or pop up when a user pointing device clicks or hovers over the relevant feature.

Figure 5:
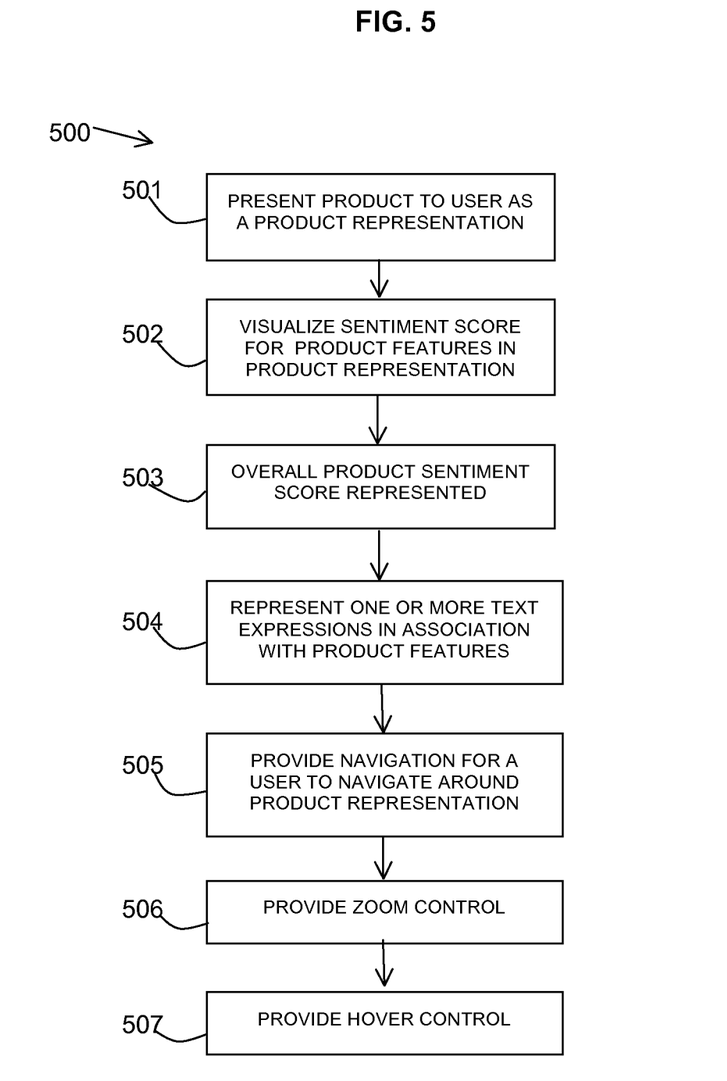
FIG. 5 is a flow diagram of an aspect of a method in accordance with the present invention.

Referring to FIG. 5, a flow diagram 500 shows an example embodiment of an aspect of the described method.

A product is presented 501 to a user as a graphic product representation in 2D or 3D. The graphic product representation may have product features with a score visualization to represent 502 a user sentiment towards the product feature. In addition, an overall product sentiment may be represented 503, for example, by showing a score visualization in relation to a small icon or outline of the product.

One or more text expressions may be represented 504 associated with the product or the product features.

User navigation may be provided 505 for a user to navigate around the product representation. A zoom control may be provided 506 for a user to zoom in or out of the product representation. A hover control may be provided 507 for a user to hover over a product feature in order to obtain more information on the features, including the text expressions.

Figure 6A:
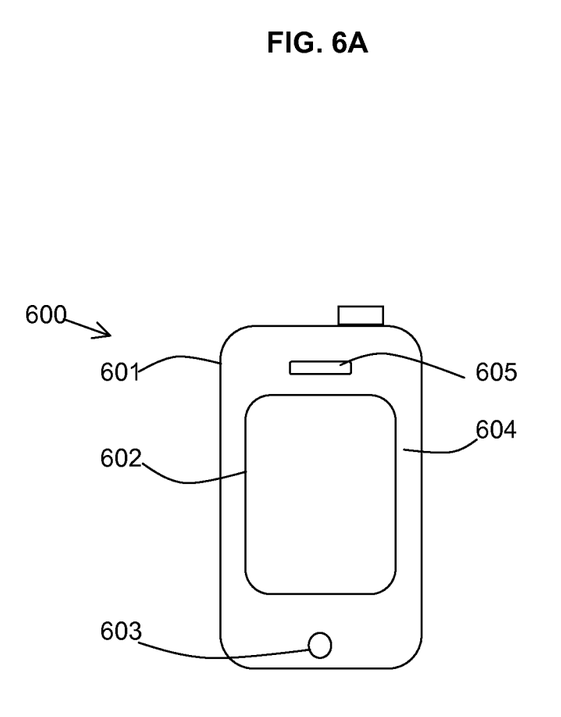
FIGS. 6A, 6B and 6C are schematic diagrams illustrating the present invention.
Figure 6B:
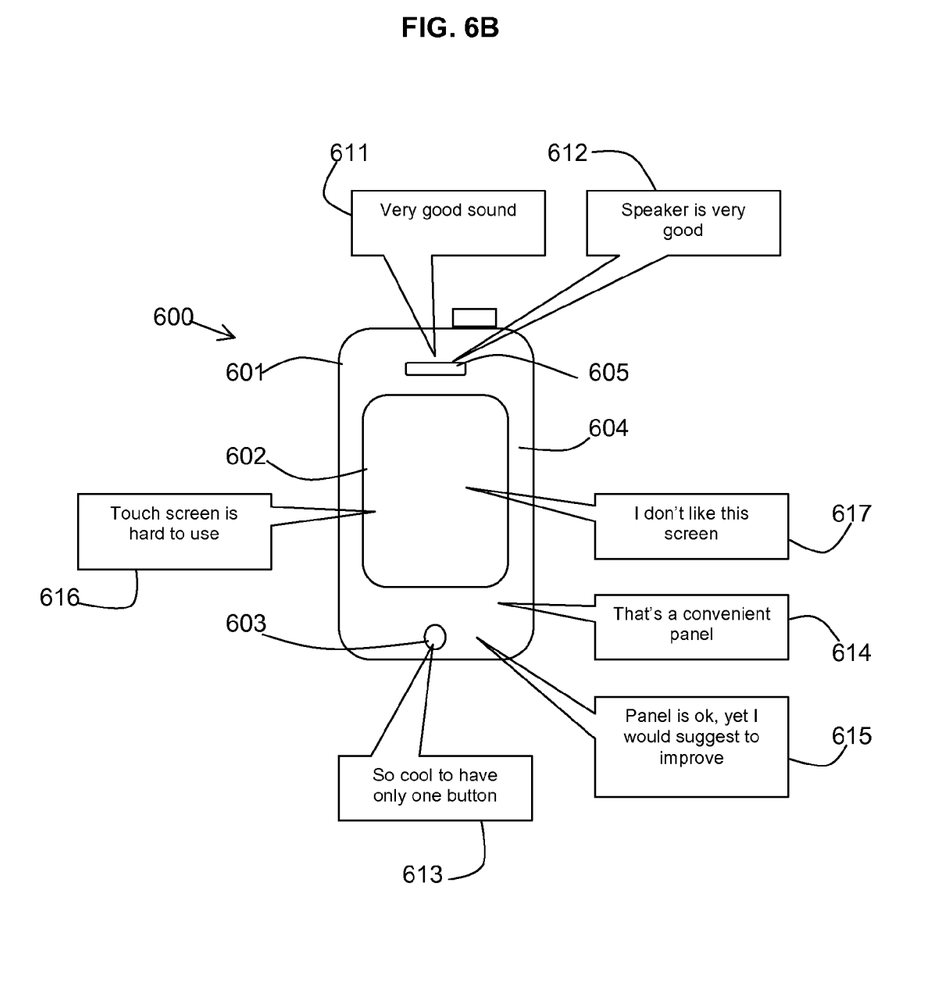
Figure 6C:
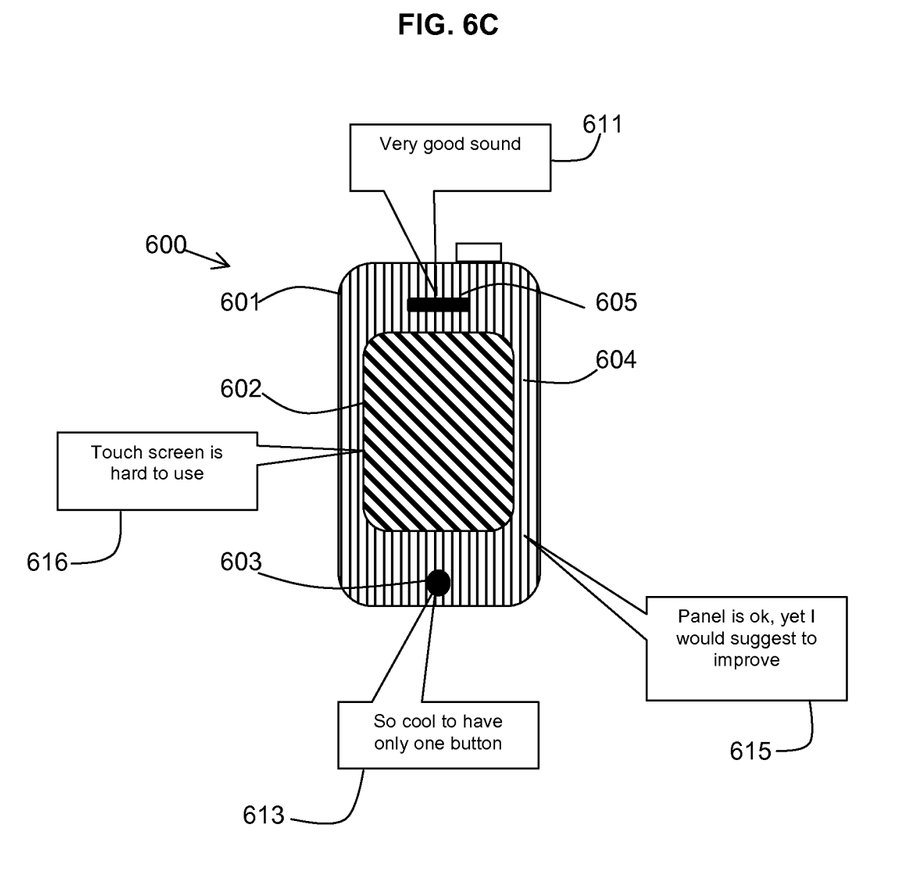

FIGS. 6A to 6C show an example product representation 600. In FIG. 6A it is shown that, in this example, the product is a mobile telephone device 601 with product features in the form of a touch screen 602, a button 603, a panel 604, a speaker 605.

Referring to FIG. 6B, for each product feature, the sentiment scores may be retrieved as well as text expressions. This is illustrated by showing call-outs for each product feature. In this example, positive feedback has been received for the speaker 605 in the form of comments: "Very good sound" 611 and "Speaker is very good" 612. Positive feedback has also been received for the button 603 in the form of comment "So cool to have only one button" 613. Positive and neutral feedback has been received for the panel 604 in the form of positive comment "That's a convenient panel" 614 and neutral comment "Panel is OK, yet I would suggest to improve" 615. Negative feedback has been received for the touch screen 602 in the form of comments: "Touch screen is hard to use" 616 and "I don't like this screen" 617. The call-outs may be colored to reflect the positive or negative feedback.

FIG. 6C shows a visualization of the user sentiment using color and feedback in the form of expressions. The product features for which positive feedback was received, the button 603 and the speaker 605, are colored green (shown by solid black color). The product feature for which negative feedback was received, the touch screen 602, is colored red (shown in diagonal stripes). The product feature for which mixed feedback was received, the panel 604 is colored a neutral color, such as yellow (shown as vertical stripes).

Selected text expressions may be provided when a product feature is selected or hovered over. In this example, a single positive expression 611 is shown for the speaker 605, a single negative expression 616 is shown for the touch screen 602, a neutral expression 615 is shown for the panel 604, and a single positive expression 613 is shown for the button 603. These expressions may be selected, as they are representative of the aggregated sentiment score for the features.

In an ecommerce settings, where products are sold to end consumers, a visualization that can capture the sentiments and opinions that users have for various product features and the product itself is very advantageous. Some consumers find it hard to map textual features and their sentiments to the actual visual image of a product, i.e., not every user understands every possible feature type. Moreover, a more integrative visualization may be better to demonstrate an aggregated view for the end consumer about the product sentiments and how its features "interact" with respect to such sentiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for visualization of user sentiment for a product, comprising:
providing a product image template, of a product offered to be purchased by consumers, wherein the product has a plurality of product features that exist simultaneously in the product, wherein the product image template having a plurality of locations respectively representing the plurality of product features;
obtaining an aggregated sentiment score for each of the plurality of product features from user generated content;
mapping the aggregated sentiment scores to score visualizations on a visualization scale, wherein each score visualization is associated with a different product feature of the plurality of product features; and
representing each of the plurality of locations in the product image template relating to a respective product feature with the mapped score visualization for the aggregated sentiment score that is associated with the respective product feature, whereby a visualization of the product is enriched with the score visualizations that indicate the aggregated sentiment scores of the plurality of product features.

2. The method as claimed in claim 1, including:
collecting user generated content;
obtaining multiple sentiment scores for the plurality of product features.

3. The method as claimed in claim 1, wherein the sentiment score is a polarity score in a given range between positive and negative sentiments.

4. The method as claimed in claim 1, including:
collecting one or more text expressions from user generated content relating to the plurality of product features;
representing one or more text expressions in relation to the plurality of product features in the product image template.

5. The method as claimed in claim 4, including:
selecting one or more most appropriate text expressions for the plurality of product features for representing in the product image template.

6. The method as claimed in claim 1, wherein the product image template forms a three-dimensional or a two-dimensional representation of the product.

7. The method as claimed in claim 6, including:
providing user navigation for the product representation to move around the product and to view the plurality of score visualizations on the plurality of locations in the product.

8. The method as claimed in claim 1, wherein the plurality of product features are located on the product image template by labeled anchors.

9. The method as claimed in claim 1, further comprising providing in each of the plurality of locations, a text expression representative of the score of the feature corresponding to the location.

10. The method as claimed in claim 9, wherein providing the text expression comprises providing the text expression responsive to hovering of a pointer device over the respective location.

11. The method as claimed in claim 1, wherein each location of the plurality of locations is a call-out area with a pointer to a representation of a corresponding product feature of the plurality of product features in the product image template.

12. The method as claimed in claim 1, including:
the product image template having a location representing the product;
obtaining a product aggregated sentiment score for the product from user generated content;
mapping the product aggregated sentiment score to a product score visualization on the visualization scale; and
representing the location in the product image template with the product score visualization, whereby a representation of the product is enriched with both the product visualization score and the visualization scores of the product features.

13. The method as claimed in claim 1, wherein the visualization scale is one of the group of: a range of colors, a range of color shades, a range of bar heights, other representation showing a range between positive and negative.

14. The method as claimed in claim 1, wherein each location of the plurality of locations is an area of the product image template which represents a corresponding product feature of the plurality of product features.

15. A system for visualization of user sentiment for one or more product features having a processor, the processor being adapted to perform the steps of:
providing a product image template of a product offered to be purchased by consumers, wherein the product has a plurality of product features that exist simultaneously in the product, wherein the product image template having a plurality of locations representing the plurality of product features;
obtaining an aggregated sentiment score for each of the plurality of product features from user generated content;
mapping the aggregated sentiment scores to score visualizations on a visualization scale, wherein each score visualization is associated with a different product feature of the plurality of product features; and
representing each of the plurality of locations in the product image template relating to a product feature with the mapped score visualization for the aggregated sentiment score that is associated with the product feature, whereby a visualization of the product is enriched with the score visualizations that indicate the aggregated sentiment scores of the plurality of product features.

16. The system as claimed in claim 15, wherein the processor is further adapted to perform the steps of:
   collecting user generated content;
   generating multiple sentiment scores for the plurality of product features.

17. The system as claimed in claim 15, wherein the processor is further adapted to perform the steps of:
   collecting one or more text expressions from user generated content relating to the plurality of product features;
   representing one or more text expressions in relation to the plurality of product features in the product image template.

18. The system as claimed in claim 17, wherein the processor is further adapted to perform the steps of:
   selecting one or more most appropriate text expressions for the plurality of product features for representing in the product image template.

19. The system as claimed in claim 15, wherein the processor is further adapted to perform the steps of:
   providing user navigation for the product representation provided by the product image templates to move around the product and to view the plurality of product features.

20. The system as claimed in claim 15, wherein the processor is further adapted to perform the steps of:
   wherein the product image template having a location representing the product;
   obtaining a product aggregated sentiment score for the product from user generated content;
   mapping the product aggregated sentiment score to a product score visualization on a visualization scale; and
   representing the location in the product image template, whereby a representation of the product is enriched with both the product visualization score and the visualization scores of the product features.

21. A computer program product for visualization of user sentiment for one or more product features, the computer program product comprising:
   a computer readable non-transitory storage medium having computer readable program code embodied therewith, the computer readable program code comprising: computer readable program code configured to:
   provide a product image template of a product offered to be purchased by consumers, wherein the product has a plurality of features that exist simultaneously, wherein the product image template having a plurality of locations representing the plurality of product features;
   obtain an aggregated sentiment score for each of the plurality of product features from user generated content;
   map the aggregated sentiment scores to score visualizations on a visualization scale, wherein each score visualization is associated with a different product feature of the plurality of product features; and
   represent each of the plurality of locations in the product image template relating to the product feature with the mapped score visualization for the aggregated sentiment score that is associated with the product feature, whereby a visualization of the product is enriched with the score visualizations that indicate the aggregated sentiment scores of the plurality of product features.

* * * * *